United States Patent [19]

Sato

[11] Patent Number: 5,274,354
[45] Date of Patent: Dec. 28, 1993

[54] SECURITY DEVICE

[75] Inventor: Tsutomu Sato, Iwaki, Japan

[73] Assignee: Alpine Electronics, Inc., Tokyo, Japan

[21] Appl. No.: 25,905

[22] Filed: Mar. 3, 1993

Related U.S. Application Data

[63] Continuation of Ser. No. 857,080, Mar. 19, 1992, abandoned, which is a continuation of Ser. No. 557,900, Jul. 25, 1990, abandoned.

[30] Foreign Application Priority Data

Aug. 18, 1989 [JP] Japan ............................ 1-96565

[51] Int. Cl.$^5$ .......................................... B60R 25/10
[52] U.S. Cl. ............................... 340/430; 340/426; 340/429; 340/539; 340/541; 340/825.5; 455/71; 455/254
[58] Field of Search .............. 340/426, 429, 430, 539, 340/541, 550, 825.5, 825.69; 455/71, 254

[56] References Cited

U.S. PATENT DOCUMENTS

| | | | |
|---|---|---|---|
| 3,732,496 | 5/1973 | Boyer | 455/69 |
| 4,691,801 | 9/1987 | Mann et al. | 180/287 |
| 4,837,558 | 6/1989 | Abel et al. | 340/550 |
| 4,866,417 | 9/1989 | DeFino et al. | 340/429 |
| 4,897,630 | 1/1990 | Nykerk | 340/426 |

Primary Examiner—John K. Peng
Assistant Examiner—Edward Lefkowitz
Attorney, Agent, or Firm—Guy W. Shoup; David W. Heid; Patrick T. Bever

[57] ABSTRACT

A security device includes a portable transmission unit that gives an instruction to start or stop security, a sensor that detects an abnormality of a tuner which receives a signal from the transmission unit and of an automobile, a sensor circuit having predetermined characteristics for discriminating the output of the sensor, and a security control section for causing a theft prevention device like a siren to be activated after output from the sensor circuit is received, wherein the characteristics of the sensor circuit can be set by the transmission unit.

6 Claims, 1 Drawing Sheet

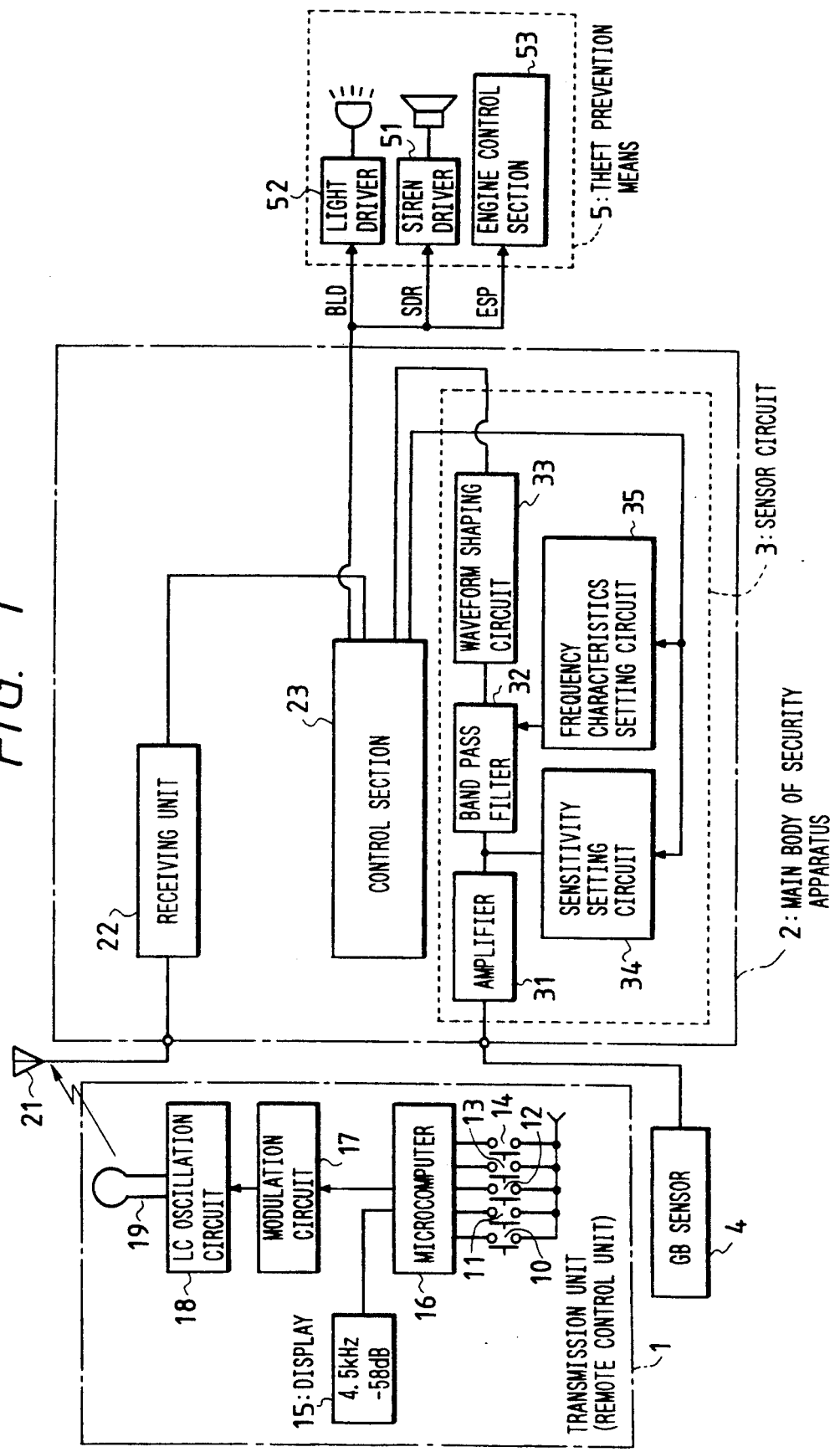

SECURITY DEVICE

This application is a continuation of application Ser. No. 07/857,080, filed Mar. 9, 1992 which is a continuation of the parent application Ser. No. 07/557,900, filed Jul. 15, 1990, both now abandoned.

BACKGROUND OF THE INVENTION

1. Field of the Invention

The present invention relates to a security device and, in particular, to a security device in which characteristics of a sensor circuit such as frequency and sensitivity can be set by a portable transmission unit.

2. Description of the Related Art

A theft prevention device (security device) for preventing an automobile from being stolen is designed to prevent theft in such a way that when someone opens a door of an automobile with a view to stealing it, gives a considerable shock to the automobile, or opens the trunk of the automobile while security is in force, it sounds a siren, blinks the headlights of the automobile, or cuts a starter (renders the engine incapable of being started), or cuts off fuel so that the automobile cannot run.

However, where a human body touches an automobile lightly or an automobile producing a tremendous noise passes by, a theft prevention device like a siren may by activated when no theft is intended depending on a whether the automobile is in a parking lot in which the security system is installed, or on whether it is bustling daytime or nighttime when few people are on the streets. Thus, it is considered that the frequency characteristics, sensitivity, etc. of a sensor circuit of the main body of a security system should be changable depending on the place, time, etc. in order to prevent the above-mentioned erroneous operations. However, the above-mentioned change must be made after the main body of the security system is removed, which is very annoying.

SUMMARY OF THE INVENTION

An object of the present invention is to provide a security device in which the sensitivity of a sensor or the like can be adjusted without removing the main body of the security system from the automobile. Another object of the present invention is to provide a security device in which the characteristics of a sensor circuit can be changed easily depending on whether the automobile is in a parking lot, the time, or the like by using a remote controller.

According to the present invention, the above-mentioned problems can be solved by an arrangement in which the characteristics of the above-mentioned sensor circuit can be set by the transmission unit in a security device having a portable transmission unit that gives an instruction to start or stop security, a sensor that detects an abnormality of a tuner which receives a signal from the transmission unit and of an automobile, a sensor circuit having predetermined characteristics for discriminating the output of the sensor, and a security control section for causing a theft prevention device like a siren to be activated after output from the sensor circuit is received.

The characteristics of the sensor circuit of the security main body are suitably selected from among a plurality of characteristics by a transmission unit which gives an instruction to start or stop security.

These and other objects, features and advantages of the present invention will become clear when reference is made to the following description of the preferred embodiments of the present invention, together with reference to the accompanying drawings.

BRIEF DESCRIPTION OF THE DRAWINGS

FIG. 1 is a block diagram illustrating a security device of the present invention.

DETAILED DESCRIPTION OF THE PREFERRED EMBODIMENT

FIG. 1 is a block diagram illustrating a security device of the present invention. The numeral 1 denotes a portable transmission unit (remote control unit) by which a starting signal or a releasing signal for a security device, or a characteristic-setting signal for setting the characteristics of a sensor circuit to be described later can be transmitted to the main body of the security device. Numeral 10 denotes an arming key for starting the security device by pressing a key, and 11 denotes a disarming key for stopping security operation. Numeral 12 denotes a frequency-characteristic selection key for transmitting the frequency-characteristic-setting signal to the sensor circuit. The frequency characteristics can be selected from among a plurality of frequency characteristics by pressing the key. Numeral 13 denotes a sensitivity selection key for selecting the sensitivity of the sensor circuit by means of which a sensitivity-setting signal to be transmitted can be selected from among a plurality of sensitivity-setting signals by pressing the key. The characteristic values selected from the frequency characteristics selection key 12 and the sensitivity setting key 13 are displayed on a display device 15. Numeral 14 denotes a transmission key for transmitting data on characteristics selected by the above-mentioned frequency-characteristic-selection key 12 and the sensitivity-setting key 13. A user presses the key when he judges the characteristic value displayed on the display device 15 to be right and transmits a predetermined code so that the characteristics of the sensor circuit 3 are determined by the selected characteristic value. Numeral 16 denotes a microcomputer which generates an ID code corresponding to the key when the key is pressed, 17 denotes a modulation circuit for amplitude-modulating an input code with a carrier wave of a predetermined frequency, 18 denotes an LC oscillation circuit for power-amplifying a modulation signal and causing electromagnetic waves to be radiated from a loop antenna 19 connected to the output side.

Numeral 2 denotes the main body of the security device which receives data transmitted from the transmission unit 1 to perform a predetermined operation, detects an abnormality which has occurred in an automobile by receiving input of a GB sensor 4 to cause the theft prevention device to be activated, e.g., sound an alarm.

In the main body 2 of the security device, numeral 21 denotes an antenna, 22 denotes a receiving unit for receiving signals transmitted from the remote control unit 1 and demodulating them, and 23 denotes a control section which receives predetermined codes transmitted from the transmission unit 1, i.e., a sensitivity setting signal and a frequency characteristic-setting signal and controls the characteristics of the sensor circuit 3. Also, the control section 23 monitors the output from a waveform shaping circuit 33 so that when its output is above a predetermined level, the theft prevention device to be described later is activated for the prevention of a theft.

Numeral 3 denotes a sensor circuit. It consists of an amplifier 31 for amplifying input from a sensor, a band pass filter 32, in which one center frequency can be selected from a plurality of frequencies, for example, 1, 4.5, or 10 KHz, for picking out predetermined band components of a center frequency selected, a waveform shaping circuit 33 for converting the output from the band pass filter 32 to a DC level, a sensitivity setting circuit 34 for setting the sensitivity of the sensor circuit 2 to one selected from among, for example, −58 dB, −52 dB, or −46 dB, and a frequency characteristic circuit 35 for setting the communication band component of the band pass filter 32 to a frequency selected from among a plurality of the abovementioned frequencies.

Numeral 4 denotes a GB sensor (glass break sensor) which detects breaking sound when the glass of an automobile is broken, etc.

Numeral 5 denotes a theft prevention device which includes an engine control section 53 for prohibiting the starting of an engine by cutting the engine starter or cutting off fuel by a signal ESP the control section 23, a siren driver 51 for sounding a siren by a driving signal SDR output from the control section 23 and, a light driver 52 for blinking headlights by a blinking signal BLD output from the control section 23, each signal is output from control section 23 when an abnormality has been detected by the GB sensor 4.

Next, the operation of the security device of the present invention will be explained by classifying it into the following two operations: (1) setting of characteristics of a sensor circuit by the transmission unit 1 and (2) operation when an abnormally has been detected.

(1) When the characteristics of the sensor circuit 3 are changed depending on the place, time, etc. at which a user parks his automobile, for example, noise containing high frequencies of a bike or the like should not be detected in a case where the automobile is to be parked at a place where automobiles and motorcycles pass by heavily during daytime. Also, sensitivity should be set lower. Hence, a user presses the frequency-characteristic selection key 12 of the transmission unit 1 until desired frequency data is displayed on the display 15. Similarly, the sensitivity selection key 13 is pressed until desired sensitivity data is displayed on the display device 15. The user checks characteristics data displayed on the display device 15. If it is right, the transmission key 14 is pressed. The microcomputer 16 generates a code corresponding to the transmission key 14 and selected characteristics data is transmitted to the main body 2 of the security apparatus via the modulation circuit 17, the LC oscillation circuit 18, and a loop antenna 19. The data transmitted from the transmission unit 1 is received and modulated by the antenna 21 and the reception unit 22 and input to the control section 23. The control section 23 discriminates the input data. When it is characteristics data, the sensitivity setting circuit 34 and the frequency characteristics setting circuit 35 are made to control the output from the amplifier 31 so that the sensor circuit 3 becomes the frequency characteristics and sensitivity desired by the user and controls the switching of a band pass filter 32. The above procedure terminates the setting of the characteristics to the sensor circuit 3, and the sensor circuit 3 operates with the set characteristics. However, since the environment where automobiles are to be parked is assumed to be bustling daytime in the abovementioned embodiment, the characteristics of the sensor circuit 3 must be set once more in accordance with the abovementioned procedure at night at which few people are on the streets.

(2) Suppose that the characteristics of the sensor circuit are set assuming nighttime at which few people are on the streets and someone breaks the glass of an automobile and invades the automobile room, then the GB sensor 4 detects the breaking sound of the glass and inputs the fact to the sensor circuit 3. The input signal is amplified by the amplifier 31, then input to the band pass filter 32. Since the frequency band filtered by the band pass filter is preset, frequency components of a value corresponding to the set value are picked out and input to the waveform shaping circuit 33. The waveform shaping circuit 33 converts the input signal to a DC level and inputs it to the control section 23. The control section determines whether or not the input DC signal is above a predetermined level; when yes, a siren driving signal SDR, a blinking signal BLD, an engine control signal ESP are output so as to cause the theft prevention means 5 to be activated for the prevention of theft.

In the above-mentioned embodiment, a GB sensor is used as a sensor for detecting an abnormality, but other sensors like a radar sensor may be used.

As has been described above, according to the present invention, since the characteristics of a sensor circuit, such as frequency characteristics and sensitivity, can be selected and set suitably from among a plurality of the characteristics by a portable transmission unit that gives an instruction to start or stop security, the characteristics of the sensor circuit depending on the place, time, etc. at which automobiles are to be parked can be changed easily. Therefore, the user is released from the burden of changes in the prior art and erroneous operations of detecting an abnormality by a contact when no theft is intended can be reduced considerably.

Many widely different embodiments of the present invention can be made without departing from the spirit and scope thereof, therefore, it is to be understood that this invention is not limited to the specific embodiments thereof except as defined in the appended claims.

What is claimed is:

1. A security device, comprising:
   a portable transmission unit for transmitting a start or stop security signal, and for transmitting a sensor circuit characteristic signal;
   a receiving unit disposed on an automobile for receiving the security signal and the sensor circuit characteristic signal from the transmission unit;
   a sensor disposed on the automobile for detecting an abnormal event occurring to the automobile and for providing an alarm signal indicative of the abnormal event;
   a sensor circuit having adjustable sensitivity characteristics for receiving the alarm signal output from the sensor and for generating a security control signal; and
   a security control section for receiving the security control signal and for causing a theft prevention device to be activated after the security control signal from the sensor circuit is received;
   wherein the sensitivity characteristics of said sensor circuit can be adjusted by said sensor circuit characteristic signal sent by the transmission unit.

2. A security device as claimed in claim 1, wherein said sensitivity characteristics are predetermined sensitivities.

3. A security device as claimed in claim 1, wherein said sensitivity characteristics are predetermined frequency characteristics and predetermined sensitivities.

4. A security device as claimed in claim 3, wherein said sensor is a glass break sensor.

5. A security device as claimed in claim 1, wherein said transmission unit includes operation keys for setting characteristics and a display device on which characteristics are displayed.

6. A security device, comprising:
- a portable transmission unit for transmitting a start or stop security signal, and for transmitting a sensitivity control signal;
- a receiving unit for receiving the start or stop security signal and the sensitivity control signal from the transmission unit;
- a sensor that detects an abnormality of an automobile;
- a control section having an armed mode and a disarmed mode, said control section ignoring signals from the sensor in the disarmed mode, and said control section judging the presence or absence of an abnormality of the sensor according to the output level of the sensor in the armed mode, said control section also causing a theft prevention device to be activated when it is determined that an abnormality has occurred, and said control section also having means for adjusting the relationships between the output level of said sensor and the level at which the control section determines that an abnormality has occurred when the control section is in the armed mode;
- wherein the means for adjusting of the control section can be adjusted by manually selecting said sensitivity control signal transmitted by the transmission unit.

* * * * *